Figure 1:
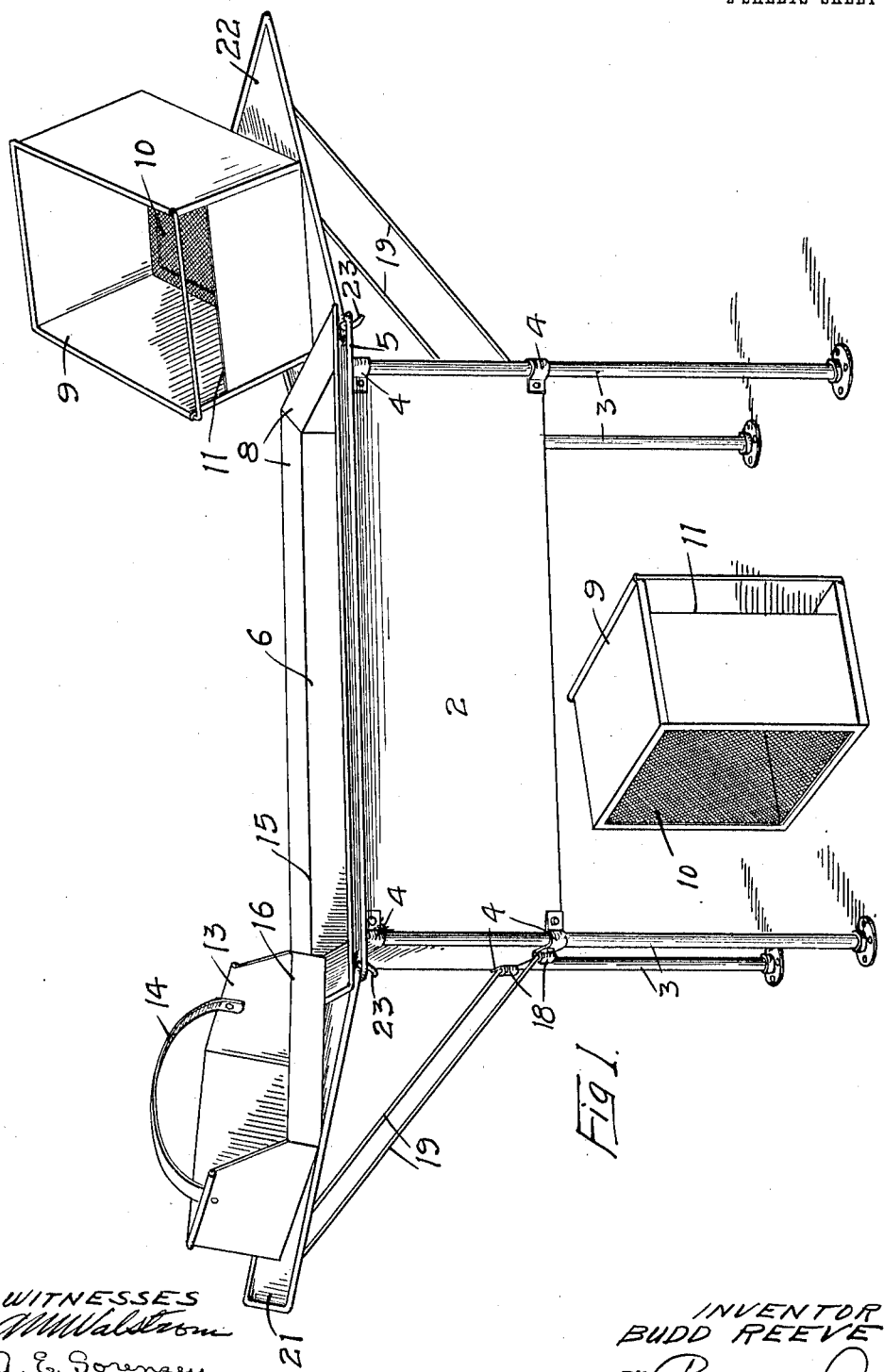

B. REEVE.
SEED CLEANSING MACHINE.
APPLICATION FILED JULY 29, 1912.

1,051,635.

Patented Jan. 28, 1913.

2 SHEETS—SHEET 1.

WITNESSES

INVENTOR
BUDD REEVE
BY
ATTORNEYS

B. REEVE.
SEED CLEANSING MACHINE.
APPLICATION FILED JULY 29, 1912.
1,051,635.
Patented Jan. 28, 1913.
2 SHEETS—SHEET 2.
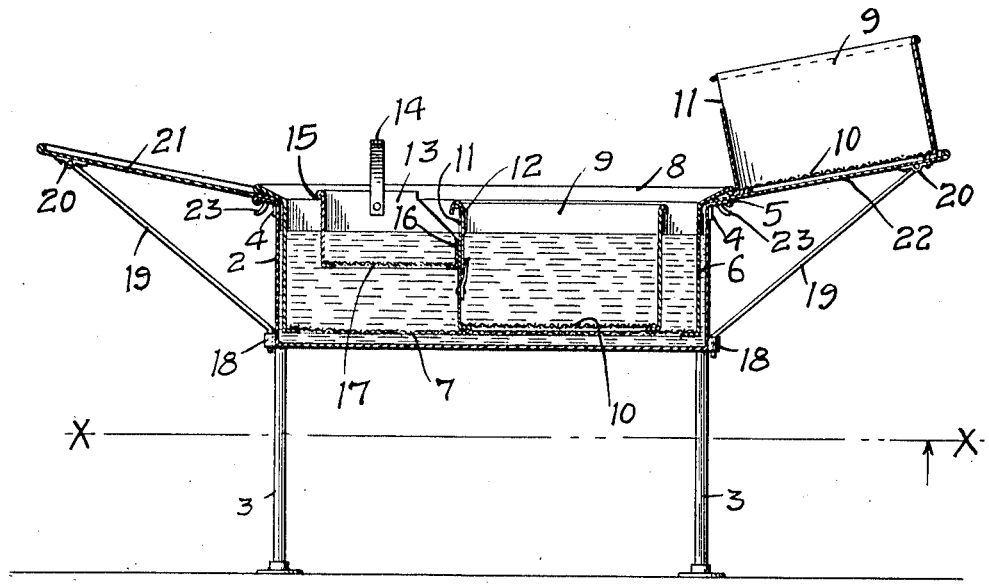
Fig 2.
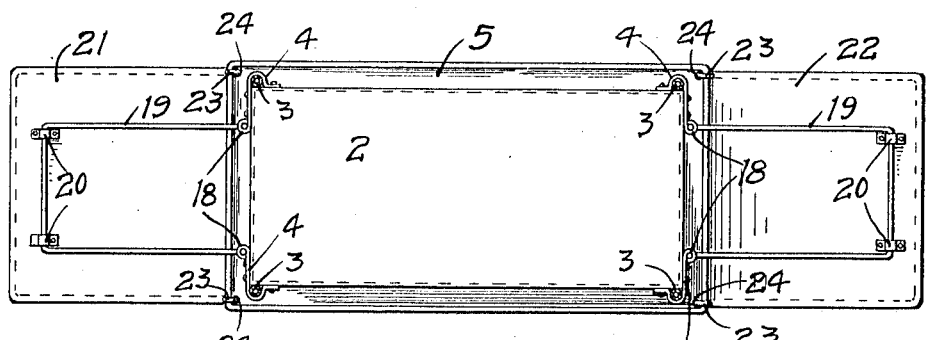
Fig 3. X-X
WITNESSES
INVENTOR
BUDD REEVE
BY Paul & Paul
ATTORNEYS

UNITED STATES PATENT OFFICE.

BUDD REEVE, OF BUXTON, NORTH DAKOTA.

SEED-CLEANSING MACHINE.

1,051,635.  Specification of Letters Patent.  Patented Jan. 28, 1913.

Application filed July 29, 1912. Serial No. 712,074.

*To all whom it may concern:*

Be it known that I, BUDD REEVE, of Buxton, Traill county, North Dakota, have invented certain new and useful Improvements in Seed-Cleansing Machines, of which the following is a specification.

My invention relates to seed cleaning machines.

My invention consists generally in various constructions and combinations, all as hereinafter described and particularly pointed out in the claims.

In the accompanying drawings forming part of this specification, Figure 1 is a perspective view of a seed cleaning machine embodying my invention, Fig. 2 is a vertical sectional view of the same, Fig. 3 is a horizontal sectional view on the line *x—x* of Fig. 2, looking upward toward the bottom of the receptacle.

In the drawing, 2 represents a tank of suitable dimensions, composed, preferably, of sheet metal and having legs 3 removably supported at the corners of the tank by means of clips 4. These legs are composed, preferably, of gas piping and may be readily removed from between the clips and the walls of the tank when it is desired to take the machine apart for packing or shipping purposes.

The tank 2 is adapted to contain a quantity of chemically prepared liquid and has an outwardly projecting flange 5 on its upper walls. Within the tank is a receptacle 6 spaced from the walls and bottom of the tank and having a perforate bottom 7. At the top of the receptacle is a flaring flange 8 which projects beyond the flange 5 of the tank and is supported thereby, thus leaving a clear space between the perforated bottom of the receptacle and the closed bottom of the tank. A grain box 9 fits within the receptacle 6 at one end thereof and also has a perforated bottom 10 and an opening or recess 11 in one end wall. This opening or recess is normally closed by a slide 12 which may be removed at any time to allow the liquid above the level of the opening in the end wall of the box to flow out over said end wall. A bucket 13 has a handle 14 and is supported on guides 15 on the side walls of the receptacle, and has a comparatively low wall 16 opposite the opening in the grain box to allow the material floating on the top of the liquid in the grain box to be skimmed from the box over the end wall thereof into the bucket, while the heavier and plumper seed suitable for planting will sink to the bottom. When this operation has been effected, the operator will remove the slide 12 and then, using it as a skimmer, will direct the refuse material floating on the water from the grain box into the bucket and when all the weed seeds and other refuse have been skimmed off the surface of the water the box is lifted and may be placed on the drain board hereinafter described. The bucket has a perforated bottom 17 to allow the liquid to drain off when the bucket is raised to discharge its contents.

I prefer also in connection with this device to provide loops 18 on the clips 4 to receive the bent ends of U-shaped brackets 19 which are pivoted at 20 to the underside of drain boards 21 and 22. These boards have hooks 23 at their inner ends which are adapted to enter holes 24 in the flange 5 of the tank, the inner ends of the drain boards extending in between the flanges 5 and 8 and directing the liquid draining from the boxes on the drain boards back into the tank.

In the operation of the machine, the grain is poured into the boxes and the plump kernels suitable for seed will sink to the bottom, while the imperfect seeds and refuse foreign material will float on the surface of the water and may be skimmed from the grain boxes into the bucket or any other suitable receptacle. When a considerable quantity of seed grain has accumulated in the bottom of the grain box, the box is removed and placed upon one of the draining boards and the chemically treated liquid, flowing down through the perforations in the bottom of the grain box, will follow the drain board down between the flanges of the tank and the receptacle and flow back into the tank, ready to be used again.

A number of grain boxes will be provided with each machine, so that while a grain box is draining, the operator may continue the separation of the imperfect seeds in another box placed within the tank. In this way the operation may be continued until the seed grain is entirely cleaned.

I claim as my invention:—

1. A seed cleansing machine comprising a tank adapted to contain a supply of water, a seed box fitting within said tank and having a perforated bottom, the weed seeds and light, imperfect grain kernels rising to the top of the water in said receptacle when a quantity of seed grain is poured therein, a bucket also having a perforated bottom fitting within said tank and having a wall adjacent to said box that is below the normal level of the water in said box, the wall of said box opposite said lower wall of said bucket having a movable section which will permit the material floating on the surface of the water in said grain box to be directed into said bucket.

2. A seed cleansing machine comprising a tank adapted to contain a supply of water, a seed box fitting within said tank and having a perforated bottom, and a recess in the upper portion of its wall, the weed seeds and the light, imperfect kernels rising to the top of the water in said box, a bucket also having a perforate bottom fitting within said tank and having a wall adjacent to said box below the level of the water in said box, the wall of said box adjacent to the low wall of said bucket having a removable slide normally closing said recess, said slide being adapted for use as a skimmer to direct the refuse material floating on the surface of the water from said box into said bucket.

3. A seed cleansing machine comprising a tank adapted to contain a supply of water, a receptacle having a perforated bottom fitting within said tank, the upper walls of said receptacle having a flaring flange formed thereon supporting said receptacle out of contact with the bottom of said tank, a grain box fitting within one end of said receptacle and resting on the bottom thereof and also having a perforate bottom and adapted to contain a supply of seed grain, the water in said tank rising above the level of the grain in said box, said box having an end wall below the normal level of the water in said box, and a bucket having a perforated bottom fitting within said receptacle and also having a wall on a level substantially with the said wall of said grain box and adjacent thereto, for the purpose specified.

4. A seed cleansing machine comprising a tank adapted to contain a supply of water, a grain box fitting within said tank and having perforations in its walls and adapted to contain a quantity of grain, the water in said tank rising in said box above the level of the grain therein and the weed seeds and imperfect kernels rising to the top of the water in said box, a bucket fitting within said tank, said box and bucket having their adjacent walls provided with means for establishing a communicating passage between them, through which the refuse material floating in said grain box may be directed into said bucket.

5. A seed cleansing machine comprising a tank adapted to contain a supply of water, a grain box fitting within said tank and having perforations in its walls and adapted to contain a quantity of grain, the water in said tank rising in said box and the weed seeds and imperfect kernels floating to the top of the water, said box having a removable section in its wall forming a recess therein below the level of the water in said tank, through which recess the surface water in said box and the weed seeds thereon may be directed, and a suitable receptacle arranged to receive the weed seeds and refuse from said box.

6. A seed cleansing machine comprising a tank adapted to contain a supply of water, a seed box fitting within said tank and having a perforated bottom, the weed seeds and light, imperfect grain kernels rising to the top of the water in said receptacle when a quantity of seed grain is poured therein, a bucket also having a perforated bottom and a wall adjacent to said box, said box having a wall over which the refuse material floating on the surface of the water may be directed into said bucket.

7. A seed cleansing machine comprising a tank adapted to contain a supply of water and having outwardly projecting flanges on its upper walls, a grain box fitting within said tank and having a perforated bottom and adapted to contain a quantity of grain, the water in said tank rising in said box above the level of the grain therein and the weed seeds and imperfect kernels rising to the top of the water in said box, a receptacle disposed adjacent to said box, the contiguous walls of said box and receptacle allowing the weed seeds and imperfect kernels to be directed thereover from said box into said receptacle, and the flanges of said tank forming supports for said box when placed transversely of said tank and operating to direct the liquid draining from said box back into said tank.

8. A seed cleaning machine comprising a tank adapted to contain a quantity of liquid and having a flanged upper edge, a receptacle fitting within said tank and having a perforated lower portion and also having a flanged upper edge, a perforated grain box fitting within said receptacle and adapted to contain a quantity of grain, the weed seeds and imperfect kernels rising to the top of the liquid in said grain box, and a drain board inclined toward said tank and having its inner end inserted between the flange of said tank and said receptacle, said drain board being adapted to support a grain box placed thereon and direct the drippings from said box back into said tank.

9. The combination, with a tank adapted to contain a quantity of liquid, of a drain board having hooks at its inner end adapted to enter holes provided in the upper walls of said tank, a brace arranged to support said drain board in an inclined position, a perforated grain box fitting within said tank and having a wall over which the material floating on the surface of the liquid in said box may be skimmed and directed out of said box, said drain board forming a support for said box and directing the drippings therefrom back into said tank.

In witness whereof, I have hereunto set my hand this 19th day of July, 1912.

BUDD REEVE.

Witnesses:
GENEVIEVE E. SORENSEN,
C. H. REHFUSS.

Copies of this patent may be obtained for five cents each, by addressing the "Commissioner of Patents, Washington, D. C."